United States Patent [19]

Wang

[11] 4,259,267
[45] Mar. 31, 1981

[54] AERATION APPARATUS BY MEANS OF VORTEX ACTION

[76] Inventor: Kenneth K. Wang, 403 Thompson Ave., Apt. #1, Glendale, Calif. 91201

[21] Appl. No.: 777,859

[22] Filed: Mar. 15, 1977

[51] Int. Cl.³ .............................................. B01F 3/04
[52] U.S. Cl. ..................................... 261/93; 210/219; 210/220; 261/36 R; 261/123; 261/DIG. 75
[58] Field of Search ................... 261/29, 36 R, 91, 93, 261/87, 123, 86, DIG. 75; 210/219, 220

[56] References Cited

U.S. PATENT DOCUMENTS

| 954,951 | 4/1910 | Furowicz | 261/93 |
| 2,130,402 | 9/1938 | Textor | 261/93 |
| 2,174,540 | 10/1939 | Wallace et al. | 261/93 X |
| 3,643,403 | 2/1972 | Speece | 261/91 X |
| 3,846,516 | 11/1974 | Carlson | 261/91 X |
| 3,986,934 | 10/1976 | Muller | 261/87 X |

FOREIGN PATENT DOCUMENTS 548664  10/1942  United Kingdom ...................... 261/93

Primary Examiner—Richard L. Chiesa

[57] ABSTRACT

An aeration apparatus, which entrains gas and circulates liquid mass. The apparatus consists of vertical tubes and a pumping device beneath the vertical tubes, all of which are constrained by a flow-confining barrel. The suction force of the pump draws down the liquid surface through the vertical tubes which induces a vortex action in each tube, and entrains gas into the center of the vortices from the gas body above the liquid surface. The entrained gas mixes with liquid and flows downward through the flow-confining barrel and is dispersed into the liquid of the tank.

8 Claims, 1 Drawing Figure

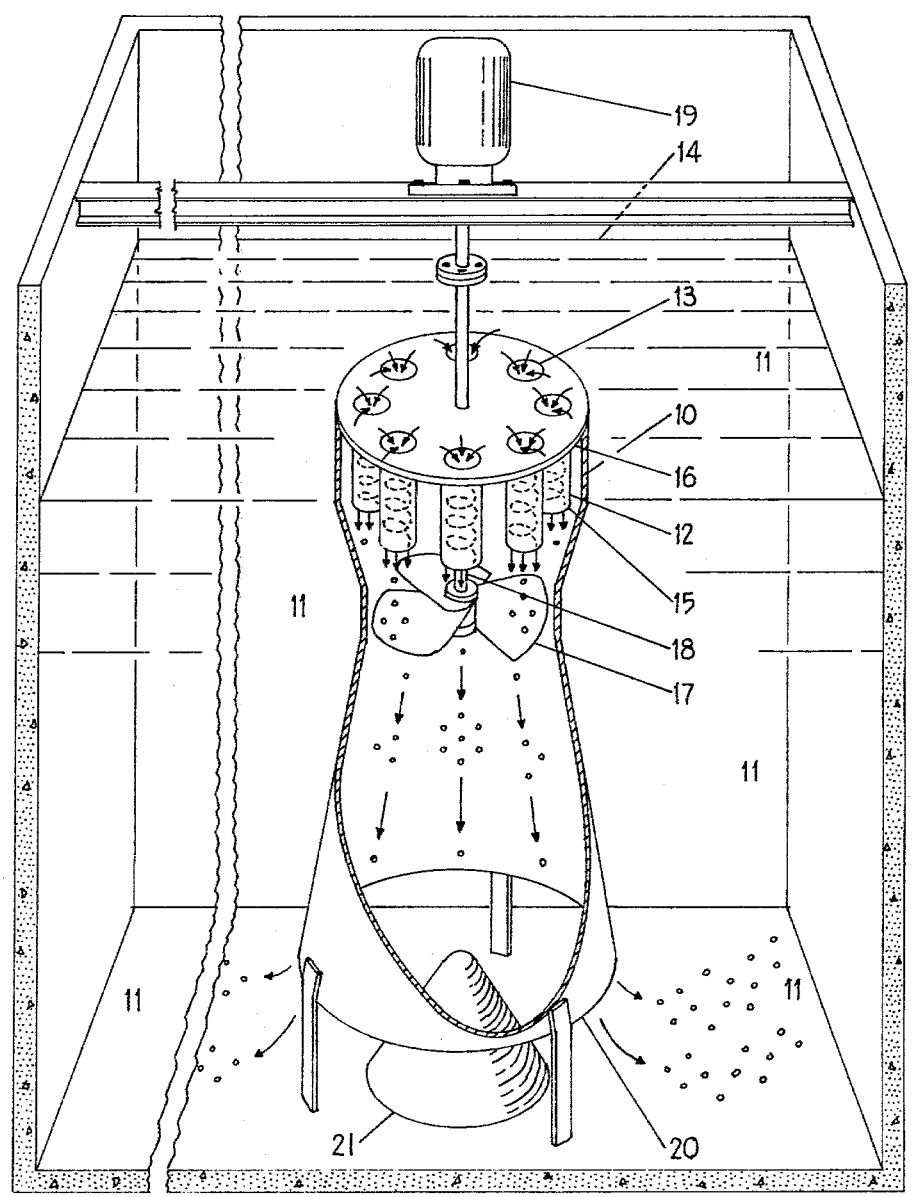

AERATION APPARATUS BY MEANS OF VORTEX ACTION

BACKGROUND AND SUMMARY OF THE INVENTION

The invention concerns an apparatus for promoting dissolution of gas into liquid by entraining gas from the liquid surface and dispersing it into the liquid body. A particularly useful application of the invention is in the aeration of wastewater for the aerobic treatment process. Up to date there are three principal methods used in activated sludge process: the submerged diffuser method, the submerged turbine method, and the surface aeration method.

In the first method, submerged diffusers are used. The gas phase is compressed and then introduced to the liquid near the bottom of the tank through a porous diffuser head. It is known that the efficiency is generally low. Besides, the cost of maintenance is high due to the clogging problem of the porous head. The second method is using a submerged turbine. The gas is compressed and let out through a conduit near the bottom of the tank. The submerged turbine is placed above the gas outlet. The rotating motion of the turbine produces kinetic energy and turbulence for dispersing and mixing the discharged gas with the liquid. With this method the absorption efficiency is higher and there is less clogging problem. However, it not only requires a gas compressor but also a rotating turbine and therefore the initial cost is high and there are more components to maintain.

The last method is known as surface aeration which utilizes a rotating body with vanes for spraying the liquid into droplets. The droplets contact with the gas phase while traveling in the air. Surface aeration is a very effective method and mechanically it is simple. However, there are many disadvantages such as inadequate local mixing, limitation in tank depth due to poor mixing and contamination of the atmosphere around the system.

BRIEF STATEMENT OF THE INVENTION

Utilizing energy more economically, the object of this mechanically simple invention is to provide a more efficient method for dissolving gas into liquids. The basic operating principle of this invention is to entrain gas into the liquid at the surface and then disperse it in the liquid body through a pumping device.

The gas entraining assembly is comprised of multiple vertical tubes with both ends open. The upper ends of the tubes are submerged just below the top of the liquid surface. The lower ends of the tubes are surrounded by the flow-confining barrel, which is vertically mounted. The pumping device is disposed below the vertical tubes and within the flow-confining barrel. As the pumping device induces a downward flow within the flow-confining barrel, the liquid is drawn through the tubes. The suction action at the upper ends of the tubes generates a vortex in each of the tubes. The velocities in the vertical tubes and in the flow confining barrel are determined to be at least higher than the bubble rising velocity relative to the liquid. The gas is then entrained into the tubes through the vortex action. The liquid with entrained gas continues down into the flow-confining barrel by the pumping device and is subsequently discharged to the liquid body through the lower end of the flow-confining barrel. The dispersed gas bubbles continue to be in contact with the tank liquid and promote efficient gas liquid mass transfer. The rate of gas entrainment depends on the depth of the submergence of the upper end of the vertical tubes. Therefore, the gas flow can be controlled at the desired rate by adjusting the position of the vertical tubes; through this adjustment the maximum efficiency of mass transfer can be achieved. While the invention has a primary application to aerate waste water, the invention can also be used to advantage for other purposes: chlorination and ozonization of water, direct contact gas liquid heat exchange and many other applications pertaining to gas liquid mixing operation.

DESCRIPTION OF DRAWING

The drawing is a perspective view of the apparatus in accordance with this invention.

With reference to the drawing, flow confining means (10) is submerged in the liquid (11) and is vertically oriented. A group of vertical tubes (12) is placed at the upper end of the flow confining means (10). The tops of these tubes (13) are positioned a short distance below the liquid surface (14), and the lower ends (15) are open to and enclosed in the flow confining means (10). The tubes (12) are attached to a plate (16) at the top end of the flow confining means (10) restricting the flow path only into the tubes (12) at their open ends (13). An impeller (17) at the end of a rotating shaft (18) is driven by a motor (19). The impeller is positioned in the flow confining means (10) below the vertical tubes (12). The impeller (17) rotates and induces a downward flow which draws the liquid into the vertical tubes (12) and into the flow confining means (10). The downward action of the flow generates vortices in the tubes and lowers the liquid surface (14) thereby entraining gas into the vertical tubes (12) through the centers of the vortices. The liquid and the gas mix in tubes (12); the flow continues downward into the flow confining means. The rotating impeller drives the gas liquid mixture further downward and subsequently disperses it into the liquid body (11) through the lower end (20) of the flow confining means (10). A flow deflector (21) is disposed underneath the lower end (20) of the flow confining means for directing the discharged flow in a desired direction.

What is claimed:

1. Apparatus for promoting dissolution of gas in a liquid comprises flow confining means which is submerged in said liquid and substantially vertically disposed; there is at least one substantially vertically disposed tube, the said tube is enclosed in the flow confining means, the upper end of said tube is positioned a short distance below the surface of said liquid and the lower end of said tube is open, a transverse barrier is across said flow confining means for holding said tube and baffling the gaps between the outer wall of said tube and the inner wall of said flow confining means, thereby the only flow path to said flow confining means at the upper end is through said tube, a pumping means is disposed within said flow confining means and below said tube for producing a downward flow within said flow confining means through said tube, the downward action at said upper end of said tube generates a vortex therein and said gas is entrained in the center of said vortex and mixed with the flowing liquid in said tube, the gas-liquid mixture is drawn in said flow confining means by the action of said pump means and subsequently dispersed into said liquid body through the lower end of said flow confining means.

2. The combination is in accordance with claim 1 wherein said apparatus comprises a plurality of said tubes.

3. The combination is in accordance with claim 1 wherein said pump means comprises at least one impeller, means for mounting said impeller, and means for rotating said impeller.

4. Apparatus as defined in claim 1 additionally comprises means for adjusting position of said tube.

5. The combination is in accordance with claim 1 wherein said liquid is contained in an open-top tank.

6. The combination is in accordance with claim 5 wherein said liquid is waste water, said gas is air.

7. The combination is in accordance with claim 1 wherein said liquid is contained in a closed-top tank.

8. The combination is in accordance with claim 6 wherein said liquid is waste water, said gas is oxygen-enriched gas.

* * * * *